United States Patent
Na et al.

(10) Patent No.: US 10,599,781 B2
(45) Date of Patent: Mar. 24, 2020

(54) APPARATUS AND METHOD FOR EVALUATING QUALITY OF AUTOMATIC TRANSLATION AND FOR CONSTRUCTING DISTRIBUTED REPRESENTATION MODEL

(71) Applicant: Samsung Electronics Co., Ltd., Suwon-si (KR)

(72) Inventors: Hwidong Na, Suwon-si (KR); Inchul Song, Suwon-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 15/254,347

(22) Filed: Sep. 1, 2016

(65) Prior Publication Data
US 2017/0132217 A1 May 11, 2017

(30) Foreign Application Priority Data
Nov. 6, 2015 (KR) .................. 10-2015-0156154

(51) Int. Cl.
| | | |
|---|---|---|
| G10L 15/04 | (2013.01) |
| G06F 17/20 | (2006.01) |
| G06F 17/28 | (2006.01) |
| G06F 17/27 | (2006.01) |
| G06N 3/04 | (2006.01) |
| G06N 3/08 | (2006.01) |

(Continued)

(52) U.S. Cl.
CPC ...... *G06F 17/2854* (2013.01); *G06F 17/2775* (2013.01); *G06N 3/049* (2013.01); *G06N 3/0445* (2013.01); *G06N 3/0454* (2013.01); *G06N 3/08* (2013.01); *G10L 15/1815* (2013.01); *G10L 15/1822* (2013.01); *G10L 15/193* (2013.01)

(58) Field of Classification Search
None
See application file for complete search history.

(56) References Cited

U.S. PATENT DOCUMENTS

| | | | |
|---|---|---|---|
| 7,209,875 B2 | 4/2007 | Quirk et al. |
| 7,496,496 B2 | 2/2009 | Quirk et al. |
| 7,779,396 B2 | 8/2010 | Meijer et al. |

(Continued)

FOREIGN PATENT DOCUMENTS

| | | |
|---|---|---|
| JP | 7-334477 A | 12/1995 |
| KR | 10-2005-0120977 A | 12/2005 |

OTHER PUBLICATIONS

Chorong Yu, et al., "Evaluation Method of Machine Translation System." The 15th Annual Conference on Human & Cognitive Language Technology, (2003) p. 241-245 (5 pages in Korean with English abstract).

*Primary Examiner* — Richard Z Zhu
(74) *Attorney, Agent, or Firm* — NSIP Law

(57) ABSTRACT

An apparatus and method for evaluating quality of an automatic translation is disclosed. An apparatus for evaluating quality of automatic translation includes a converter which converts an automatic translation and a reference translation of an original text to a first distributed representation and a second distributed representation, respectively, using a distributed representation model and a quality evaluator which evaluates quality of automatic translation data based on similarity between the first distributed representation and the second distributed representation.

17 Claims, 10 Drawing Sheets

(51) Int. Cl.
*G10L 15/193* (2013.01)
*G10L 15/18* (2013.01)

(56) References Cited

U.S. PATENT DOCUMENTS

| | | | |
|---|---|---|---|
| 7,912,843 B2 | 3/2011 | Murdock et al. | |
| 8,229,729 B2* | 7/2012 | Sarikaya | G06F 17/2818 |
| | | | 704/2 |
| 8,886,579 B2 | 11/2014 | De Sousa Webber | |
| 8,977,536 B2 | 3/2015 | Och | |
| 9,606,988 B2* | 3/2017 | Andreoli | G06F 17/2854 |
| 10,255,275 B2* | 4/2019 | Song | G06F 17/2818 |
| 10,268,685 B2* | 4/2019 | Zeng | G06F 17/2705 |
| 2005/0137854 A1* | 6/2005 | Cancedda | G06F 17/28 |
| | | | 704/9 |
| 2005/0246298 A1 | 11/2005 | Almeida et al. | |
| 2006/0009963 A1* | 1/2006 | Gaussier | G06F 17/2735 |
| | | | 704/7 |
| 2006/0265209 A1* | 11/2006 | Bradford | G06F 17/2809 |
| | | | 704/9 |
| 2009/0326912 A1* | 12/2009 | Ueffing | G06F 17/2818 |
| | | | 704/2 |
| 2011/0307495 A1* | 12/2011 | Shoshan | G06F 17/2854 |
| | | | 707/748 |
| 2012/0158398 A1* | 6/2012 | Denero | G06F 17/2818 |
| | | | 704/2 |
| 2012/0330647 A1* | 12/2012 | Burges | G06F 17/277 |
| | | | 704/9 |
| 2013/0204885 A1* | 8/2013 | Clinchant | G06K 9/4676 |
| | | | 707/756 |
| 2014/0006003 A1* | 1/2014 | Soricut | G06F 17/2854 |
| | | | 704/2 |
| 2014/0114642 A1* | 4/2014 | van den Oever | G06F 17/2818 |
| | | | 704/2 |
| 2014/0249799 A1 | 9/2014 | Yih et al. | |
| 2015/0286632 A1* | 10/2015 | Meunier | G06F 17/2854 |
| | | | 704/2 |
| 2016/0098386 A1* | 4/2016 | Rangarajan | G06F 17/273 |
| | | | 704/9 |
| 2016/0179790 A1* | 6/2016 | Watanabe | G06F 17/2818 |
| | | | 704/7 |
| 2017/0060854 A1* | 3/2017 | Zeng | G06F 17/2705 |
| 2017/0060855 A1* | 3/2017 | Song | G06F 17/2818 |
| 2017/0068665 A1* | 3/2017 | Tamura | G06F 17/2818 |

* cited by examiner

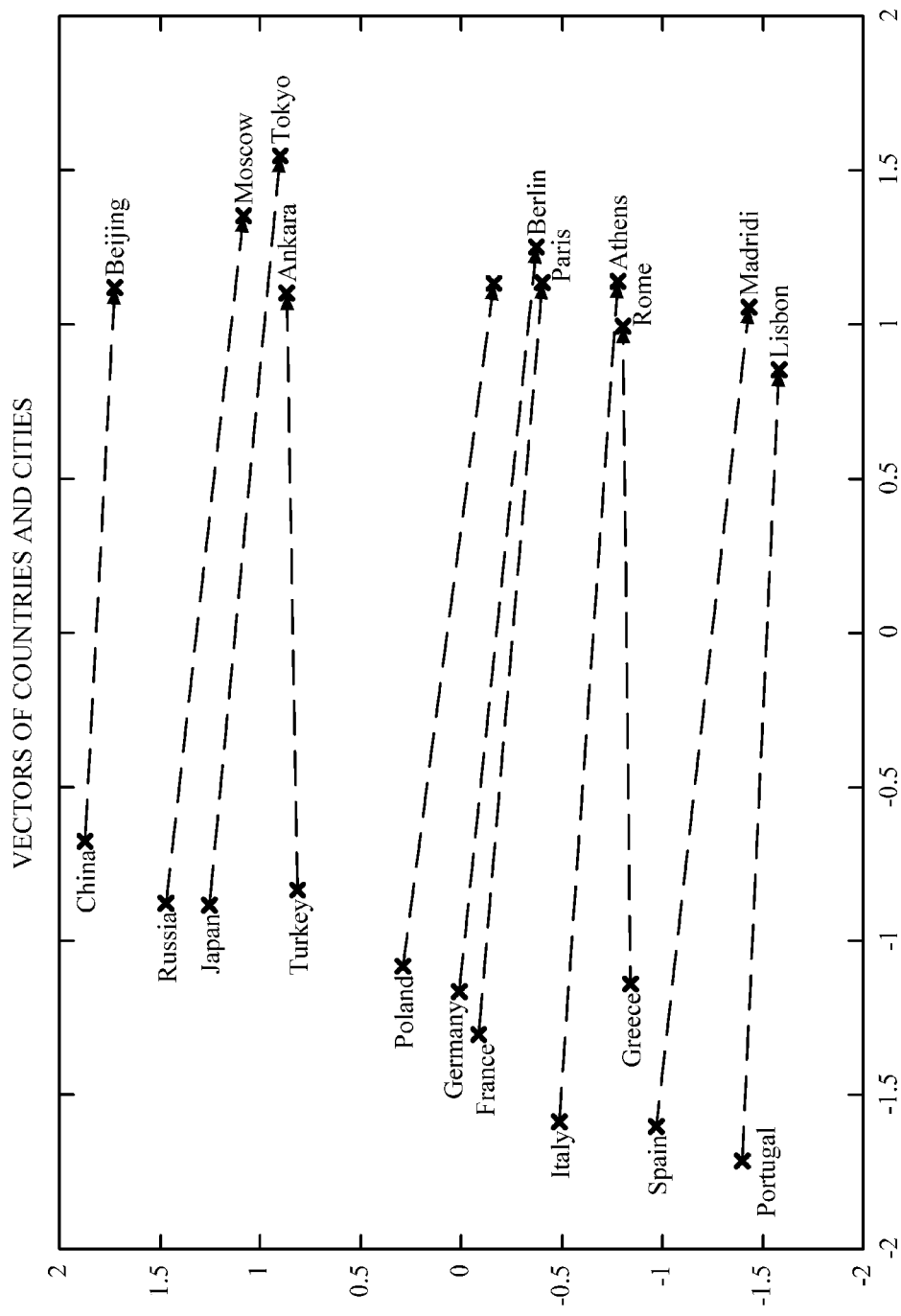

APPARATUS AND METHOD FOR EVALUATING QUALITY OF AUTOMATIC TRANSLATION AND FOR CONSTRUCTING DISTRIBUTED REPRESENTATION MODEL

CROSS-REFERENCE TO RELATED APPLICATION(S)

This application claims the benefit under 35 USC § 119(a) of Korean Patent Application No. 10-2015-0156154, filed on Nov. 6, 2015, in the Korean Intellectual Property Office, the entire disclosure of which is incorporated herein by reference for all purposes.

BACKGROUND

1. Field

The following description relates to a technology of evaluating quality of automatic translation using a distributed representation.

2. Description of Related Art

Quality of machine translation translated by an automatic translator may be evaluated using a manual evaluation method or an automatic evaluation method. An expert who is familiar with both a source language and a target language is needed to manually evaluate an automatic translation. For example, an expert grades an automatically translated result based on two criteria, fluency and adequacy. Fluency represents whether a translation contains natural sentences, and adequacy represents whether the meaning of an original text is expressed effectively in the translated language. The automatic evaluation method includes manually generating a reference translation of an original text and evaluating similarity between an automatically translated result and the manually generated reference translation.

Bilingual evaluation understudy (BLEU) is widely used as the automatic evaluation method. BLEU evaluates how many times adjacent n-words which exist in the automatically translated result (n-gram) appear in the manually generated translation. Although the conventional automatic evaluation method has an advantage over the manual evaluation method, since it only considers a case in which the automatically translated result and the manually translated result accurately correspond to each other, a case in which an excellent translation result is graded low or an incorrect translation is graded high occurs.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided apparatus for evaluating quality of automatic translation, the apparatus including a processor configured to convert an automatic translation and a reference translation of an original text to a first distributed representation and a second distributed representation, respectively, using a distributed representation model, and evaluate quality of the automatic translation based on similarity between the first distributed representation and the second distributed representation.

The processor may include a converter configured to convert an automatic translation and a reference translation of an original text to a first distributed representation and a second distributed representation, respectively, using a distributed representation model, and a quality evaluator configured to evaluate quality of the automatic translation based on similarity between the first distributed representation and the second distributed representation.

The distributed representation model may learn through a neural network.

The neural network may include at least one of a deep neural network, a recurrent neural network, a recursive neural network, or a spike neural network.

The reference translation may include a manual translation in which the original text is manually translated.

The quality evaluator may be configured to calculate a distance between the first distributed representation and the second distributed representation by calculating a distance between vectors and to calculate the similarity based on the calculated distance.

The apparatus of claim 6, wherein the distance comprises at least one of an Euclidean distance, a Hamming distance, a Manhattan distance, or a cosine distance.

The quality evaluator may be configured to calculate the similarity to be inversely proportional to the calculated distance.

In one general aspect, there is provided a method for evaluating quality of automatic translation, the method comprising converting an automatic translation and a reference translation of an original text to a first distributed representation and a second distributed representation, respectively, using a distributed representation model, calculating similarity between the first distributed representation and the second distributed representation, and evaluating quality of the automatic translation based on the calculated similarity.

The distributed representation model may learn through a neural network.

The neural network may include at least one of a deep neural network, a recurrent neural network, a recursive neural network, or a spike neural network.

The reference translation may include a manual translation in which the original text is manually translated.

The calculating of the similarity may include calculating the distance between the first distributed representation and the second distributed representation by calculating a distance between vectors and calculating the similarity based on the calculated distance.

The calculating of the similarity may include calculating the similarity to be inversely proportional to the calculated distance.

In one general aspect, there is provided an automatic translation apparatus including a processor configured to receive an original text, automatically translate the original text, convert the automatic translation into a distributed representation using a distributed representation model, and evaluate quality of the automatic translation using the distributed representation.

The processor may include an interface configured to receive an original text, a translator configured to automatically translate the original text, an evaluator configured to convert the automatic translation into a distributed representation using a distributed representation model and to evaluate quality of the automatic translation using the distributed representation, and the processor is further configured to re-translate the original text or to output the automatic translation, based on a result of evaluation.

The distributed representation model may learn through a neural network so that the automatic translation is converted into a distributed representation that has a form of an embedding vector disposed in a multi-dimensional space.

The evaluator may be configured to convert a reference translation of the original text into a distributed representation and to evaluate quality of the automatic translation based on similarity between distributed representations of the automatic translation and the distributed representation of the reference translation.

The processor may be configured to control the translator to re-translate the original text, in response to the result of quality evaluation not satisfying a criteria, and to output the automatic translation in response to the criteria being satisfied.

The interface may be configured to receive information regarding a target language.

The automatic translation apparatus of claim 17, wherein the processor is further configured to recommend an update to the translator, in response to the result of quality evaluation not satisfying a criteria.

The processor may be configured to recommend an update to the distributed representation model, in response to the result of quality evaluation not satisfying a criteria more than a number of times.

An apparatus for constructing a distributed representation model, the apparatus including a learning data collector configured to collect an original text, a manual translation of the original text, a distributed representation, and a similar translation of the original text as learning data, and a model builder configured to construct a distributed representation model used in evaluating quality of an automatic translation by allowing neural networks to learn the collected learning data.

The neural network may include a first neural network configured to receive the manual translation as an input and to output the distributed representation, a second neural network configured to receive the distributed representation as an input and to output the original text, and a third neural network configured to receive the distributed representation as an input and output the similar translation.

The model builder may be configured to configure the first neural network, the second neural network, and the third neural network as a deep neural network and to allow the deep neural network to learn through one learning process.

In response to learning of the first neural network, the second neural network, and the third neural network using the learning data being completed, the model builder may be configured to construct a distributed representation model based on the first neural network.

Other features and aspects will be apparent from the following detailed description, the drawings, and the claims.

BRIEF DESCRIPTION OF THE DRAWINGS

FIG. 2C is a diagram illustrating an example of a distributed representation.

Figure 1:
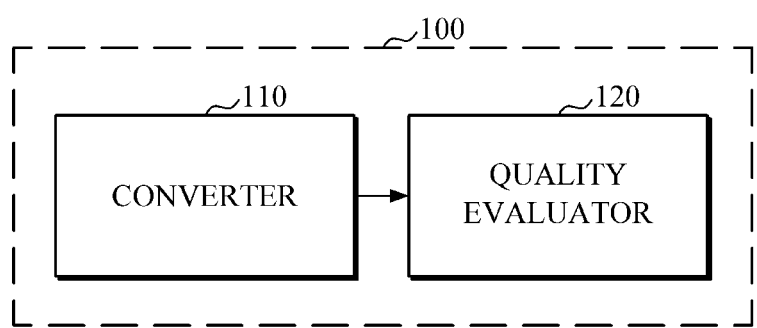
FIG. 1 is a diagram illustrating an automatic translation quality evaluation apparatus, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 2A:
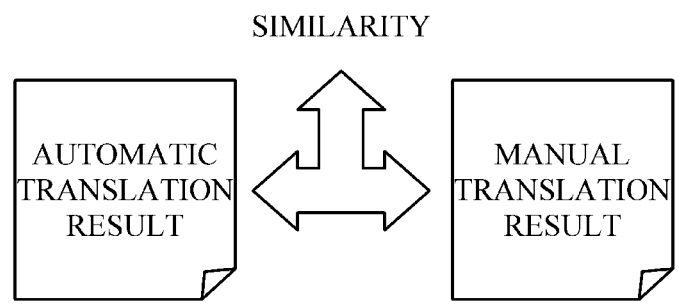
FIG. 2A is a diagram illustrating an example of an automatic evaluation method.
Figure 2B:
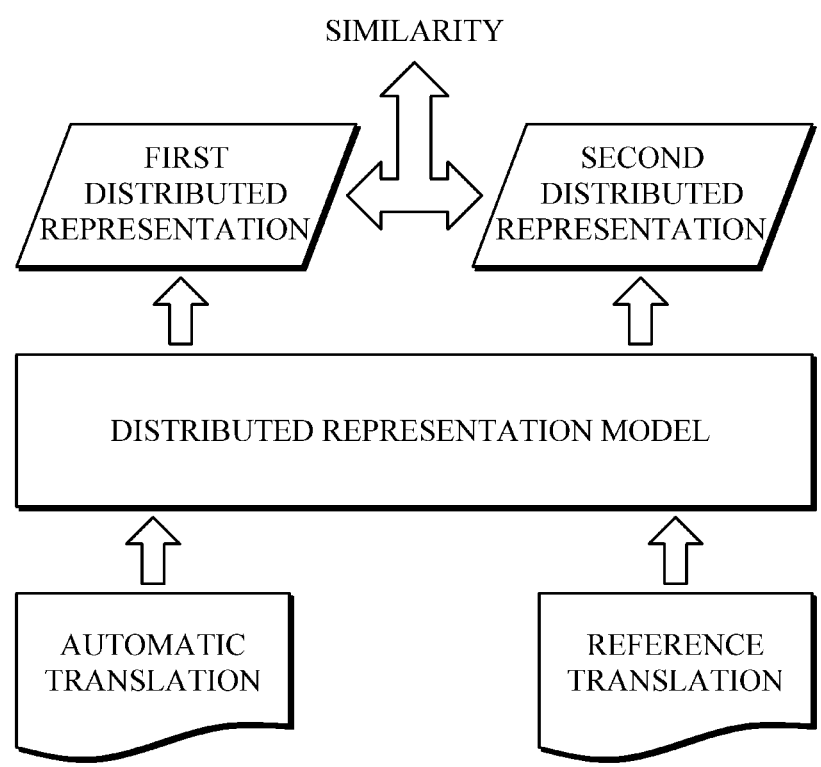
FIG. 2B is a diagram illustrating an example of an automatic evaluation method.

FIG. 1 is a diagram illustrating an automatic translation quality evaluation apparatus according to an embodiment. FIG. 2A is a diagram illustrating an example of an automatic evaluation method. FIG. 2B is a diagram illustrating an example of an automatic evaluation method. FIG. 2C is a diagram illustrating an example of a distributed representation.

Referring to FIG. 1, an automatic translation quality evaluation apparatus 100 includes a converter 110 and a quality evaluator 120.

In an example, the converter 110 converts an automatic translation and a reference translation of an original text into a first distributed representation and a second distributed representation, respectively, using a distributed representation model as illustrated in FIG. 2B. The automatic translation is a translation output by an automatic translation apparatus, and the reference translation is a manual translation of the original text manually translated by an expert. In another example, the reference translation may include an automatic translation of an original text, which satisfies predefined criteria or a translation similar to the manual translation.

In an example, the distributed representation is expressed with an embedding vector, and the embedding vector refers to showing an input value, e.g., a particular word, in a multi-dimensional vector form in which each of the dimensions has a real number value on a multi-dimensional vector space. One or more attributes may correspond to a particular dimension of the vector, and a particular attribute may be expressed by being divided into one or more dimensions. By applying a multi-dimensional scaling (MDS) technique to a distance matrix between words, the embedding vector may be arranged as one point on the multi-dimensional embedding vector space.

FIG. 2C shows a distributed representation obtained with respect to particular words, e.g. countries and cities, reduced in two-dimension. As illustrated, each of the countries form one group and each of the cities which belong to each of the countries forms another group, and it can be seen that order of arrangement of the countries and the cities which belong to the countries mostly correspond to each other. Thus, the distributed representation represents semantic similarity between input values effectively.

In an example, the converter 110 uses a distributed representation model to convert the automatic translation and the manual translation into distributed representations expressed with embedding vectors. In an example, the distributed representation model may be constructed in advance through neural networks learning. The neural networks may include a deep neural network, a recurrent neural network that provides information on a time axis, a recursive neural network that is recursively configured, and an artificial neural network such as a spiking neural network. Learning data may be one or more sentences, which are semantically similar with respect to one sentence, and the distributed representation model may be constructed through repeated learning using the learning data so that a particular sentence corresponds to a semantically similar sentence through a distributed representation.

The automatic translation quality evaluation apparatus 100 may receive a distributed representation model from a distributed representation model construction apparatus 400 which uses various learning data to construct a distributed representation model as will be described with reference to FIG. 4 and may store the received distributed representation model in a memory or a database which is not illustrated. In addition, the automatic translation quality evaluation apparatus 100 may receive a constructed distributed representation model from the distributed representation model construction apparatus 400 periodically or every time the distributed representation model is constructed and update the distributed representation model.

When the automatic translation and the reference translation are converted into distributed representations, which represent semantic similarity effectively, as described above, the quality evaluator 120 may compare the first distributed representation of the automatic translation and the second distributed representation of the reference translation and evaluate quality of the automatic translation.

As illustrated in FIG. 2B, the quality evaluator 120 may calculate similarity between the first distributed representation and the second distributed representation and evaluate quality using the similarity. In an example, the quality evaluator 120 may directly use the calculated similarity as a quality evaluation score or may process the similarity value to fit the purpose of quality evaluation and use as the quality evaluation score. In another example, the quality evaluator 120 may divide quality into a plurality of quality sections (e.g. good, fair, poor) according to the similarity and may output quality of a quality section to which the calculated similarity belongs as a result of quality evaluation of the automatic translation.

For example, the quality evaluator 120 may use a vector distance calculation technique, such as, for example, the Euclidean distance to calculate a distance between a vector of the first distributed representation and a vector of the second distributed representation and may calculate similarity based on the calculated distance. When the distance is calculated, the quality evaluator 120 may use a value resulting from subtracting the calculated distance from a reference value (e.g. 1) as similarity so that the similarity is inversely proportional to the calculated distance and may use the similarity or a processed value of the similarity as a quality evaluation score. In other examples, other than the Euclidean distance, the vector distance calculation technique may include technique such as, for example, a Hamming distance, a Manhattan distance, and a cosine distance.

According to an embodiment, since quality is evaluated by calculating similarity between converted distributed representations using a distributed representation model constructed through neural networks learning, semantic similarity between input values, i.e., the automatic translation and the reference translation, may be effectively reflected. On the other hand, as illustrated in FIG. 2A, since similarity is calculated by comparing an automatic translation of an original text and a manual translation of the original text manually translated by an expert with each other in a conventional automatic evaluation method, accuracy of evaluation may be lowered when the automatic translation and the manual translation are not in accurate forms.

Figure 3:
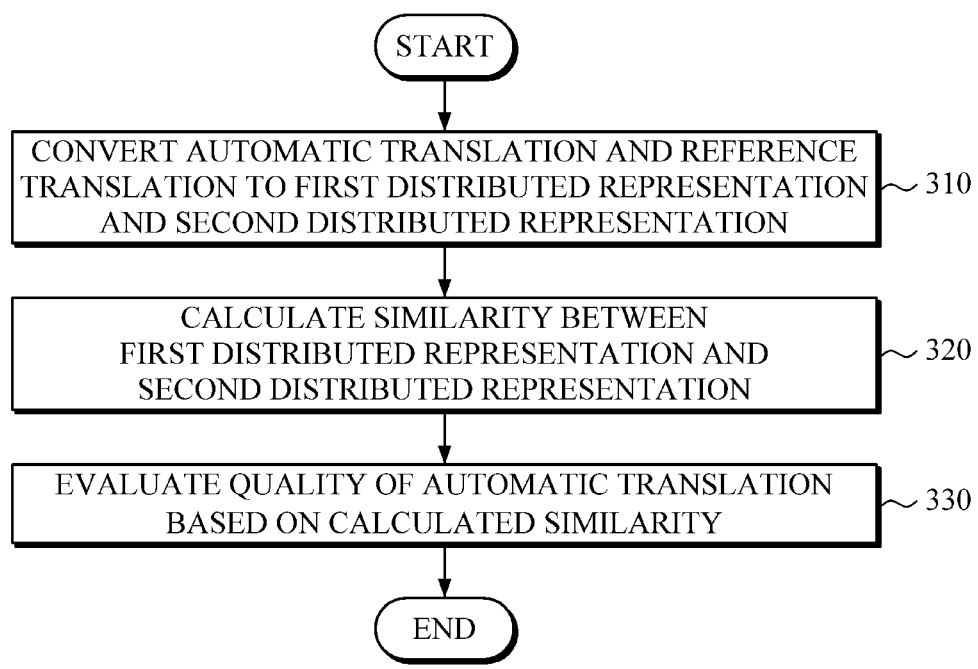
FIG. 3 is a diagram illustrating an example of an automatic translation quality evaluation method.

FIG. 3 is a diagram illustrating an example of an automatic translation quality evaluation method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In addition to the description of FIG. 3 below, the above descriptions of FIGS. 1-2C, are also applicable to FIG. 3, and are incorporated herein by reference. Thus, the above description may not be repeated here.

Referring to FIG. 3, in 310, the automatic translation quality evaluation apparatus 100 converts an automatic translation of an original text translated by an automatic translation apparatus and a reference translation of the original text into a first distributed representation and a second distributed representation, respectively, using a distributed representation model. Here, the first distributed representation and the second distributed representation each represent the automatic translation and the reference translation expressed in vector forms in which each of the dimensions has a real number value in a multi-dimensional vector space.

In 320, the automatic translation quality evaluation apparatus 100 may calculate similarity between the converted first distributed representation and the second distributed representation. For example, the automatic translation quality evaluation apparatus 100 may calculate a distance between a vector of the first distributed representation and a vector of the second distributed representation and calculate the similarity based on the calculated distance. In an example, the distance between the vectors may be determined using any one of vector calculation techniques mentioned above.

In 330, the automatic translation quality evaluation apparatus 100 may evaluate quality of the automatic translation using the calculated similarity. In an example, the automatic translation quality evaluation apparatus 100 may convert the calculated similarity into a quality evaluation score and output the quality evaluation score. In another example, quality level sections according to similarity may be predefined, and quality of a section to which the calculated similarity belongs may be output based on a result of evaluation.

Figure 4:
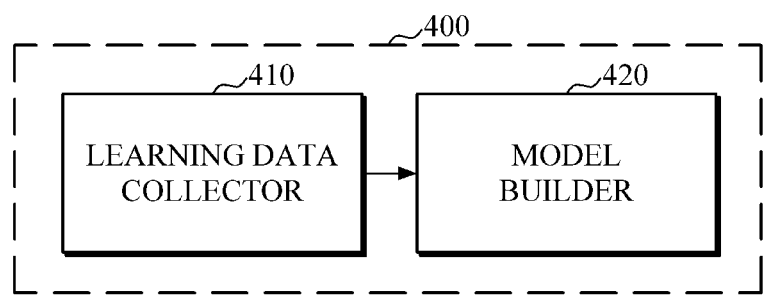
FIG. 4 is a diagram illustrating an example of a distributed representation model construction apparatus.
Figure 6:
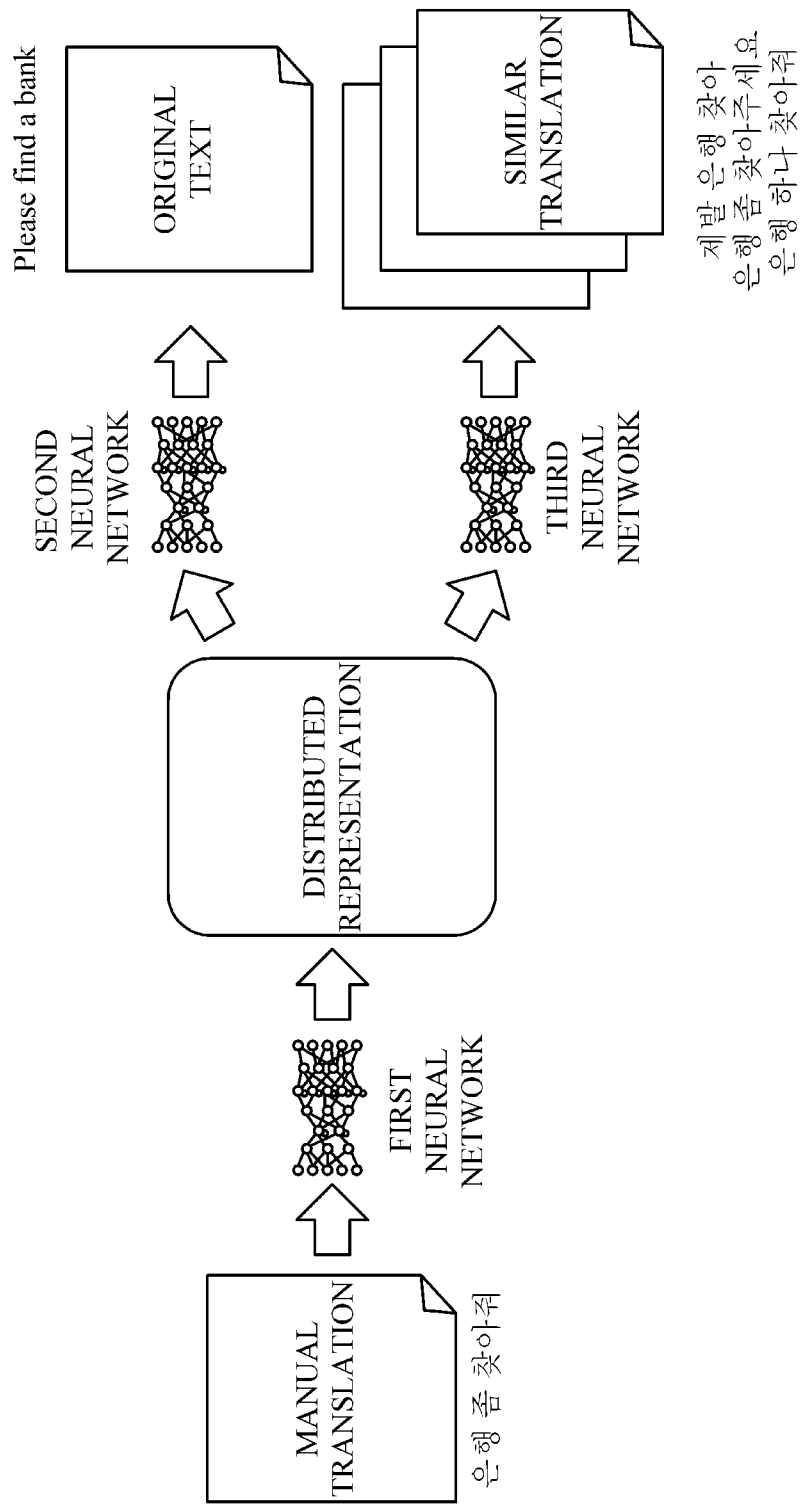
FIG. 6 is a diagram illustrating an example of a neural networks learning to construct a distributed representation model.

FIG. 4 is a diagram illustrating an example of a distributed representation model construction apparatus. The distributed representation model construction apparatus 400 is an apparatus for constructing a distributed representation model to be used by the automatic translation quality evaluation apparatus 100 according to the embodiment of FIG. 1. FIG. 6 is a diagram illustrating an example of the distributed representation model construction apparatus 400 allowing neural networks to learn to construct a distributed representation model.

Referring to FIG. 4, the distributed representation model construction apparatus 400 includes a learning data collector 410 and a model builder 420.

The learning data collector 410 may collect an original text, a manual translation of the original text manually translated by an expert, a distributed representation, and a similar translation of the original text.

For example, when constructing a distributed representation model used in translating English to Korean, the learning data collector 410 may collect an English sentence such as "Please find a bank" as an original text, and Korean sentences such as "은행 좀 찾아줘" as a manual translation of the original text, and "제발 은행 찾아," "은행 좀 찾아 주세요," and "은행 좀 찾아 주세요," and 은행 하나 찾아줘 as similar translations as the learning data as illustrated in FIG. 6. In addition, a distributed representation, which represents words in the manual translation "은행 좀 찾아줘" as embedding vectors on a multi-dimensional vector space may be further collected.

The model builder 420 may allow neural networks to learn the collected learning data to construct a distributed representation model.

For example, as illustrated in FIG. 6, the neural networks may include a first neural network, a second neural network, and a third neural network. In an example, the first neural network is a network configured to receive the manual translation manually translated by an expert among the collected learning data as an input and to output a distributed representation provided as an answer. In an example, the second neural network is a network configured to receive a distributed representation as an input and to output the original text. In an example, the third neural network is a network configured to receive a distributed representation as an input and output a similar translation.

In an example, the first neural network, the second neural network, and the third neural network may form one deep neural Network ("DNN") by an output node of the first neural network being connected to input nodes of the second neural network and the third neural network. By configuring the three neural networks as one network, the model builder 420 may allow the first neural network, the second neural network, and the third neural network to learn through one learning process. However, since this is merely an embodiment, and embodiments are not particularly limited thereto. In another example, separate networks may be formed by the first neural network being connected to the second neural network and the first neural network being connected to the third neural network. In this example, the network in which the first neural network is connected to the second neural network and the network in which the first neural network is connected to the third neural network may be integrated into one network after learning separately.

The model builder 420 may repeatedly learn so that the manual translation approaches the original text or the similar translation through the distributed representation, and when learning is completed, may construct a distributed representation model based on the result. For example, the model builder 420 may construct a learning result of the first neural network, which converts the manual translation into the distributed representation among the three neural networks, which have finished learning, i.e., an embedding matrix, as the distributed representation model.

According to an embodiment, the distributed representation model construction apparatus 400 may be implemented in an independent hardware apparatus and connected to the automatic translation quality evaluation apparatus 100 or an automatic translation apparatus 700 to be described below over a wired or wireless network. Although not illustrated, the distributed representation model construction apparatus 400 may receive a request to provide a distributed representation model from the automatic translation quality evaluation apparatus 100 or the automatic translation apparatus 700. In another example, the distributed representation model construction apparatus 400 may receive a request to transmit a distributed representation model constructed according to preset policies to the automatic translation quality evaluation apparatus 100 or the automatic translation apparatus 700 to update the distributed representation model.

Figure 5:
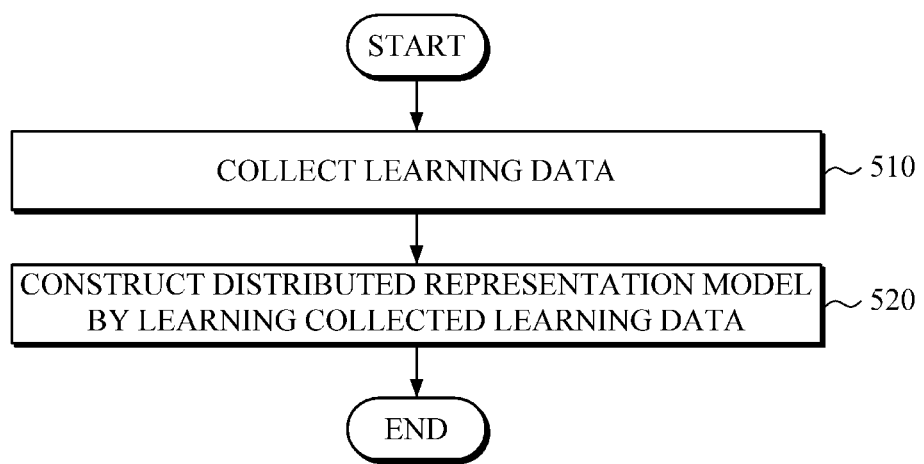
FIG. 5 is a diagram illustrating an example of a distributed representation model construction method.

FIG. 5 is a diagram illustrating an example of a distributed representation model construction method.

Referring to FIG. 5, in 510, in a distributed representation model construction method for evaluating quality of automatic translation, the distributed representation model construction apparatus 400 collects learning data for neural networks learning. In an example, the collected learning data includes an original text to be translated, a manual translation of the original text manually translated by an expert, a distributed representation of the manual translation, and a translation similar to the manual translation.

In 520, when the learning data is collected, the distributed representation model construction apparatus 400 may allow neural networks to learn the learning data and, when the learning is completed, may use the result to construct a distributed representation model required for an automatic translation.

As it has been described with reference to FIG. 6, the neural networks may be configured as one DNN in which the plurality of neural networks are connected. Here, the plurality of neural networks may be, for example, the first neural network configured to receive the manual translation manually translated by an expert among the collected learning data as an input and output a distributed representation provided as an answer, the second neural network configured to receive a distributed representation as an input and output the original text, and the third neural network configured to receive a distributed representation as an input and output a similar translation. The distributed representation model construction apparatus 400 may allow the neural networks configured as one DNN as described above to learn through one learning process.

When the learning of the neural networks is finished, the distributed representation model construction apparatus 400 may use a learning result of the first neural network which converts the manual translation into a distributed representation to construct a distributed representation model.

Figure 7:
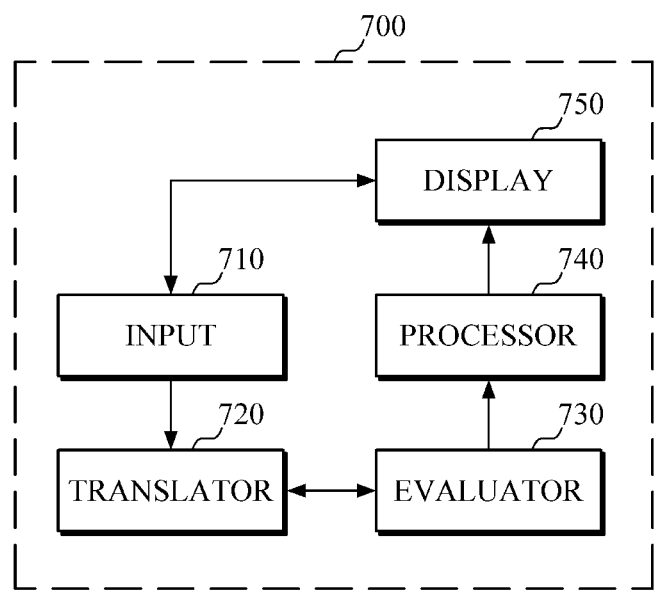
FIG. 7 is a diagram illustrating an example of an automatic translation apparatus.

FIG. 7 is a diagram of an automatic translation apparatus according to an embodiment. The automatic translation apparatus 700 according to the embodiment is an apparatus, which automatically translates a first language into a second language according to a user's request and may include the automatic translation quality evaluation apparatus 100 of FIG. 1. In an example, the automatic translation apparatus 700 may be manufactured as a portable translator. In another example, the automatic translation apparatus 700 may be embedded in or interoperate with various digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be implemented in a smart appliance, an intelligent vehicle, or in a smart home system.

The digital devices may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

Referring to FIG. 7, the automatic translation apparatus 700 includes an input 710, a translator 720, an evaluator 730, a processor 740, and a display 750.

The input 710 receives an original text to be translated from a user. In an example, a form of data of the original text to be translated, which is input from the user is not particularly limited and may be voice data of user or text data. When the user attempts to translate using the automatic translation apparatus 700 embedded in a smartphone, for example, the user may input a voice signal using a microphone of the smartphone. In another example, when the user attempts to send a message to a user who speaks a different language, the user may input a text written in a first language as an original text. Various situations for automatic translation other than above may exist, and data on an original text in the form of voice, text, or gestures may be input to fit different situations. In an example, the text input to the input unit 710 is input through the display 750.

In an example, the input 710 receives from the user information on a second language, which is a target language. In another example, the user may preset proper information on a second language according to situations in which the user mostly uses the second language, and in this case, the user may omit inputting the information on the second language.

According to an embodiment, when data on an original text is input as a voice from the user, the input 710 may transmit the original text to a voice recognition engine to perform voice recognition and receive a text, which is a result of voice recognition from the voice recognition engine.

When an original text to be translated is input from the user, the translator 720 may translate through an automatic translation engine. In an example, when the input 710 has received second language information from the user, the translator 720 may translate using the received second language information. In another example, the translator 720 may check preset second language information and translate using the preset second language information.

When an automatic translation is generated by the translator 720, the evaluator 730 may evaluate quality of the automatic translation. The evaluator 730 may use a distributed representation model constructed in advance to convert the automatic translation into a distributed representation and may evaluate quality of the automatic translation using the converted distributed representation.

The evaluator 730 may manage a reference translation or a distributed representation of the reference translation and compare a distributed representation of the reference translation to the distributed representation of the automatic translation to evaluate quality of the automatic translation. In an example, when the reference translation exists, the evaluator 730 may convert the reference translation into a distributed representation in advance using a distributed representation model used in converting the automatic translation. The evaluator 730 may calculate a vector distance (e.g. Euclidean distance) between the distributed representation of the reference translation and the distributed representation of the automatic translation and calculate similarity between the two distributed representations using the distance and may evaluate quality of the automatic translation based on the similarity.

The evaluator 730 may output a quality evaluation result of the automatic translation using various indices such as, for example, quality levels good, fair, and poor. In another example, the evaluator 730 may output a quality evaluation result of the automatic translation using various quality scores, such as, for example, a score out of 100 points. The quality level or the quality score determined by evaluator 730 the may be output on the display 710.

In an example, the display 750 may be a physical structure that includes one or more hardware components that provide the ability to render a user interface and/or receive user input. The display 750 can encompass any combination of display region, gesture capture region, a touch sensitive display, and/or a configurable area. The display 750 can be embedded in the automatic translation apparatus 700 or may be an external peripheral device that may be attached and detached from the automatic translation apparatus 700. The display 750 may be a single-screen or a multi-screen display. A single physical screen can include multiple displays that are managed as separate logical displays permitting different content to be displayed on separate displays although part of the same physical screen. The display 750 may also be implemented as an eye glass display (EGD), which includes one-eyed glass or two-eyed glasses.

The processor 740 may process various operations using the quality evaluation result output by the evaluator 730.

For example, when the quality evaluation result does not satisfy preset criteria, the processor 740 may make the translator 720 to re-translate the original text. In an example, when the quality evaluation result does not satisfy the preset criteria repeatedly, the processor 740 may recommend an update or a replacement of the automatic translation engine to the user. In another example, the processor 740 may perform a replacement or an update of the automatic translation engine through a related system according to the user's request or a preset policy. Here, the preset criteria may be set differently according to various conditions or situations of the user such as the purpose of translation or an application which has requested translation.

In another example, when the quality evaluation result satisfies the preset criteria, the processor 740 may process various types of operations that fit a situation in which the user has requested an automatic translation. For example, the processor 740 may output the automatic translation on the display 750. In another example, when the automatic translation apparatus 700 has received a request for translation from a mobile terminal of the user that is wired or wirelessly connected, the processor 740 may transmit the automatic translation to the mobile terminal. In another example, when the automatic translation apparatus 700 is embedded in the mobile terminal of the user and the user requests a translation by inputting an original text with voice, the processor 740 may convert the automatic translation into voice and output the voice through a speaker. In another example, when the user has requested an automatic translation with respect to a text input in a message application, the processor 740 may output a translation by inserting the automatic translation into a text input window. However, the examples are for convenience of understanding, and embodiments are not limited thereto.

In still another example, the processor 740 may determine whether to update a current distributed representation model based on a quality evaluation result. When the processor 740 determines that an update is required, the processor 740 may receive a new distributed representation model from the distributed representation model construction apparatus and construct a current distributed representation model. For example, when the user is in a foreign airport, even when requested original texts have been translated by a proper translation engine, the translation may not be converted to an accurate distributed representation when a distributed representation model has not learned learning data corresponding to the situation of being at a foreign airport. As a result, the quality evaluation result may not be accurate. In an example, the processor 740 determines that the current distributed representation model does not sufficiently support the user's current situation when the quality evaluation result of automatic translations with respect to a particular situation do not satisfy predetermined criteria for more than a predetermined number of times. The processor 740 may receive a distributed representation model corresponding to the user's current situation from the distributed representation model construction apparatus and update the current distributed representation model.

Figure 8:
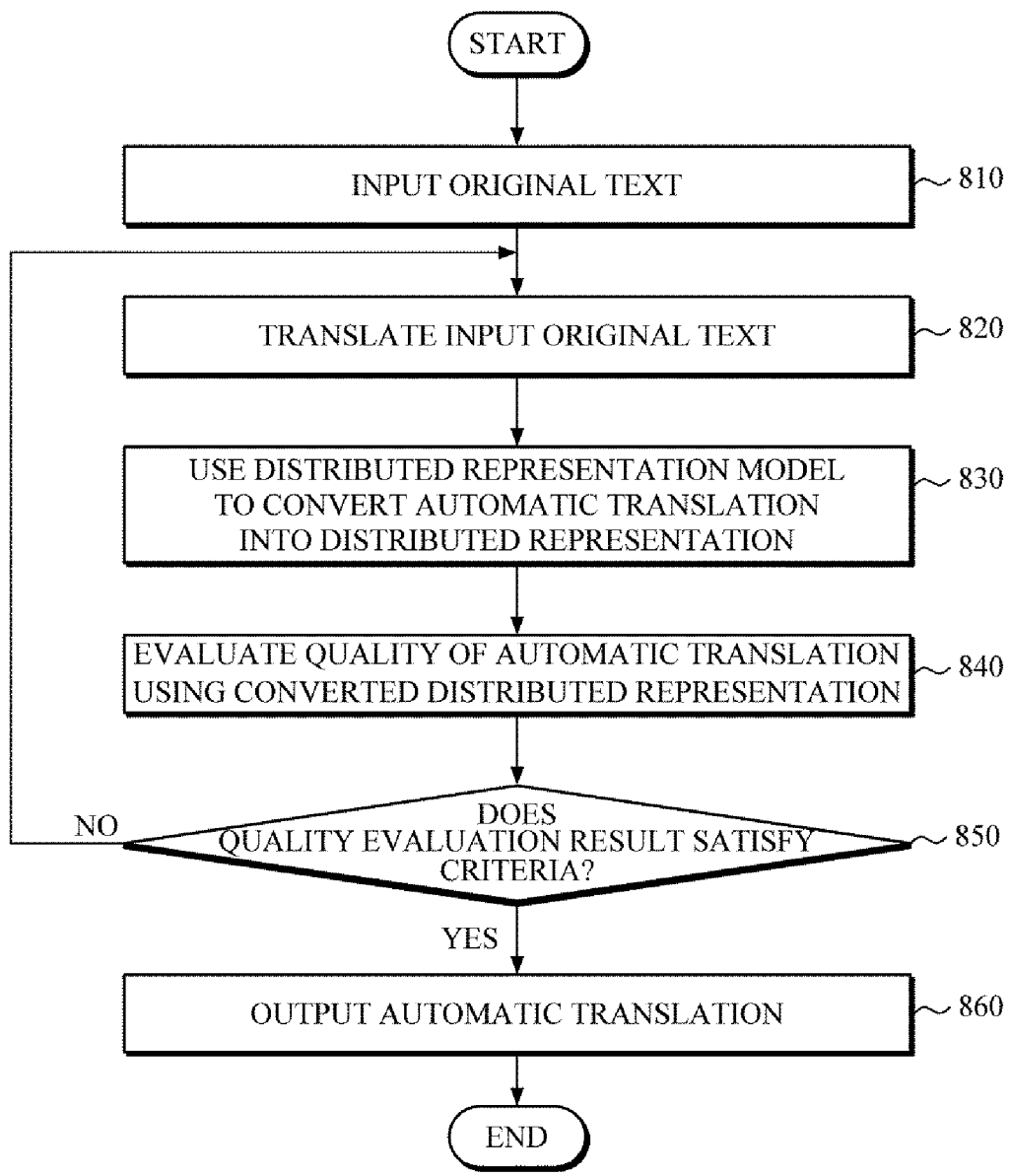
FIG. 8 is a diagram illustrating an example of an automatic translation method.

FIG. 8 is a diagram illustrating an example of an automatic translation method. Since the automatic translation method of FIG. 8 is performed by the automatic translation apparatus 700 of FIG. 7, the automatic translation method will be briefly described below. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. In addition to the description of FIG. 8 below, the above descriptions of FIGS. 1-7, are also applicable to FIG. 8, and are incorporated herein by reference. Thus, the above description may not be repeated here.

In 810, the automatic translation apparatus 700 receives an original text in a first language to be translated from a user. Here, a form of input data on the original text is not particularly limited and may be input in various forms, such as, for example, a gesture, a voice, or a text.

In 820, the automatic translation apparatus 700 may translate the input original text to a second language desired by the user through an automatic translation engine.

In 830, the automatic translation apparatus 700 may convert the automatic translation into a distributed representation using a distributed representation model. In an example, the distributed representation model is constructed by learning through neural networks.

In 840, the automatic translation apparatus 700 may evaluate quality of the automatic translation using the converted distributed representation of the automatic translation. When the reference translation exists, the automatic translation apparatus 700 may convert the reference translation into a distributed representation using a distributed representation model and may compare the distributed representation of the reference translation to the distributed representation of the automatic translation to evaluate quality of the automatic translation. In an example, the evaluator 730 calculate a vector distance (e.g. Euclidean distance) between the distributed representation of the reference translation and the distributed representation of the automatic translation and calculates similarity between the two distributed representations using the distance and evaluates quality of the automatic translation based on the similarity.

In 850, the automatic translation apparatus 700 may determine whether the quality evaluation result satisfies criteria. When the quality evaluation result does not satisfy the criteria as a result of the determination, the automatic translation apparatus 700 may translate the input original text (820) again. When the quality evaluation result satisfies the criteria as a result of the determination, the automatic translation apparatus 700 may output the automatic translation (860) to the display 750. In 860, while performing the outputting of the automatic translation, the automatic translation apparatus 700 may process various operations described above other than outputting the automatic translation on the display 750.

The automatic translation quality evaluation apparatus 100, converter 110, quality evaluator 120, distributed representation model construction apparatus 400, data collector 410, model builder 420, automatic translation apparatus 700, input 710, translator 720, evaluator 730, processor 740, and display 750 described in FIGS. 1, 4, and 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 5 and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for evaluating quality of automatic translation, the apparatus comprising:
   a processor configured to:
   perform a first automated translation process to provide a first automatic translation of an original text;
   generate a first distributed representation, corresponding to the first automatic translation of the original text, using a distribution representation model;

generate a second distributed representation, corresponding to a reference translation of the original text, using the distributed representation model, such that the second distributed representation represents the reference translation and at least one similar translation to the reference translation;

determine a similarity between the first distributed representation and the second distributed representation by comparing the first distributed representation and the second distributed representation;

determine a quality score of the first automatic translation for the evaluating based on the similarity between the first distributed representation and the second distributed representation; and in response to the quality score of the first automatic translation being determined to fail to meet a predetermined criteria, reconstruct, using a previous result of the determining of the quality score of the first automatic translation, the distribution representation model to perform a second automated translation process to provide a second automatic translation of the original text using the reconstructed distribution representation model, and to determine a quality score of the second automatic translation for the evaluating.

2. The apparatus of claim 1, wherein the distributed representation model learns through a neural network.

3. The apparatus of claim 2, wherein the neural network comprises at least one of a deep neural network, a recurrent neural network, a recursive neural network, or a spike neural network.

4. The apparatus of claim 1, wherein the reference translation comprises a manual translation in which the original text is manually translated.

5. The apparatus of claim 1, wherein:
the first and second distributed representations are represented in first and second vectors, respectively; and
the processor is further configured to determine the similarity by calculating a distance between the first and second vectors,
wherein the similarity corresponds to the calculated distance.

6. The apparatus of claim 5, wherein the distance comprises at least one of an Euclidean distance, a Hamming distance, a Manhattan distance, or a cosine distance.

7. The apparatus of claim 5, wherein the processor is further configured to calculate the similarity to be inversely proportional to the calculated distance.

8. The automatic translation apparatus of claim 1, wherein the processor is further configured to, based on the quality score of the first automatic translation, determine whether to perform the second automated translation process to provide the second automatic translation of the original text using the reconstructed distributed representation model or provide the first automatic translation.

9. The automatic translation apparatus of claim 8, wherein the processor is further configured to:
provide the first automatic translation in response to the quality score of the first automatic translation satisfying the predetermined criteria.

10. The apparatus of claim 1, wherein the distributed representation model is created based on the original text, the reference translation, the second distributed representation, and the at least one similar translation.

11. The apparatus of claim 1, wherein the distributed representation model is constructed through repeated learning of learning data comprising at least one sentence that is semantically similar to a first sentence, such that a distributed representation of the first sentence created using the distributed representation model further corresponds to the at least one sentence.

12. A processor-implemented method for evaluating quality of automatic translation, the method comprising:
performing a first automated translation process to provide a first automatic translation of an original text;
generating a first distributed representation, corresponding to the first automatic translation of the original text, using a distributed representation model;
generating a second distributed representation, corresponding to a reference translation of the original text, using the distributed representation model, such that the second distributed representation represents the reference translation and at least one similar translation to the reference translation;
determining a similarity between the first distributed representation and the second distributed representation by comparing the first distributed representation and the second distributed representation;
determining a quality score of the first automatic translation for the evaluating based on the determined similarity between the first distributed representation and the second distributed representation; and
in response to the quality score of the first automatic translation being determined to fail to meet a predetermined criteria,
reconstructing, using a previous result of the determining of the quality score of the first automatic translation, the distribution representation model to perform a second automated translation process to provide a second automatic translation of the original text using the reconstructed distribution representation model, and to determine a quality score of the second automatic translation for the evaluating.

13. The method of claim 12, wherein the distributed representation model learns through a neural network.

14. The method of claim 12, wherein the reference translation comprises a manual translation in which the original text is manually translated.

15. The method of claim 12, wherein:
the first and second distributed representations are represented in first and second vectors, respectively; and
the comparing of the first distributed representation and the second distributed representation to determine the similarity comprises calculating a distance between the first and second vectors.

16. The method of claim 15, wherein the determining of the similarity comprises calculating the similarity to be inversely proportional to the calculated distance.

17. A non-transitory computer-readable storage medium storing instructions that, when executed by a processor, cause the processor to perform the method of claim 12.

* * * * *